(12) United States Patent
Liggett et al.

(10) Patent No.: US 10,136,705 B2
(45) Date of Patent: Nov. 27, 2018

(54) MAGNETIC GATE FOR A CARIBINER

(71) Applicant: Ropes Courses, Inc., Allegan, MI (US)

(72) Inventors: James Allen Liggett, Allegan, MI (US); Sean Raymond Horihan, Allegan, MI (US)

(73) Assignee: Ropes Courses, Inc., Allegan, MI (US)

( * ) Notice: Subject to any disclaimer, the term of this patent is extended or adjusted under 35 U.S.C. 154(b) by 0 days.

(21) Appl. No.: 15/455,359

(22) Filed: Mar. 10, 2017

(65) Prior Publication Data
US 2018/0255882 A1      Sep. 13, 2018

(51) Int. Cl.
*A44B 13/02*   (2006.01)
*A62B 35/00*   (2006.01)
*F16B 45/02*   (2006.01)

(52) U.S. Cl.
CPC .......... *A44B 13/02* (2013.01); *A62B 35/0037* (2013.01); *A44D 2203/00* (2013.01); *A44D 2211/02* (2013.01); *F16B 45/02* (2013.01)

(58) Field of Classification Search
CPC ......... Y10T 24/45319; Y10T 24/45414; Y10T 24/45366; Y10T 24/4512; Y10T 24/45361; F16B 45/02; A44B 13/02; A44D 2203/00
See application file for complete search history.

(56) References Cited

U.S. PATENT DOCUMENTS

| | | | |
|---|---|---|---|
| 5,608,953 A * | 3/1997 | Petzl | F16B 45/02 24/582.11 |
| 8,474,112 B2 * | 7/2013 | Thompson | F16B 45/02 24/582.11 |

* cited by examiner

*Primary Examiner* — Robert Sandy
(74) *Attorney, Agent, or Firm* — Polson Intellectual Property Law P.C.; Christopher R. Sylvain

(57) ABSTRACT

A carabiner gate for a carabiner having an outer cylinder and an inner cylinder, that can only be opened with the use of a properly located magnet to move a sliding pin and allow rotation of the outer cylinder to open the carabiner.

20 Claims, 6 Drawing Sheets

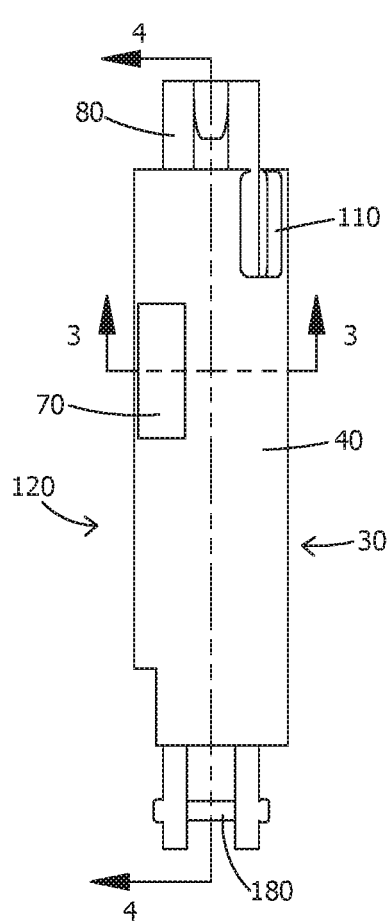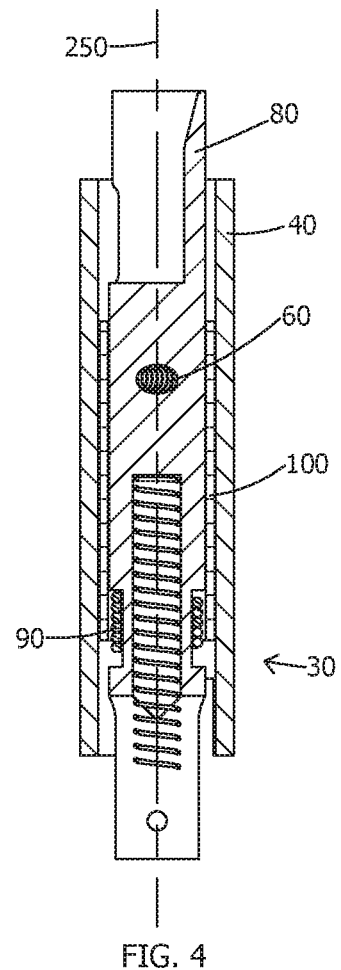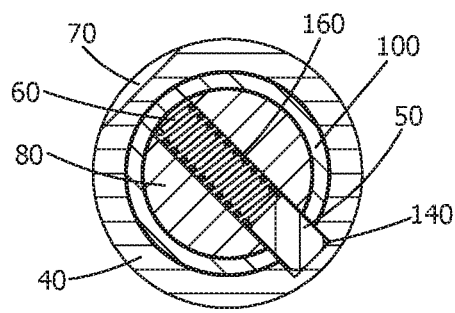

MAGNETIC GATE FOR A CARIBINER

FIELD OF THE INVENTION

The present invention relates to carabiners. More particularly to a gate used in connection with a carabiner. Carabiners with locking mechanisms are used in challenge courses or climbing to increase safety by reducing or preventing undesired opening of the carabiner. These carabiners typically connect the user who is wearing a harness to a rope for climbers or trolley in the case of a challenge course.

BACKGROUND OF THE INVENTION

Carabiner clips are used to securely fasten things together. For example, for challenge courses, the carabiner can attach a safety harness to a lanyard to secure the person from falling. The carabiner clips currently in use can generally be opened by the user. If opened the carabiner can become unclipped from the lanyard or safety harness or both. People may intentionally or accidentally open the carabiner. The "gate" of the carabiner typically refers to the part of the carabiner that opens and closes.

What is needed is a gate that can only be opened with a magnet. Most people do not carry magnets with them.

What is also needed is a gate that can only be opened when the magnet is positioned in a non-obvious or concealed location.

SUMMARY OF THE INVENTION

One aspect of the present disclosure is a magnetic gate for a carabiner, comprising: an outer cylinder having a sliding pin recess; an inner cylinder having a bore; said outer cylinder rotatably disposed outside of said inner cylinder; said bore containing a sliding pin; and a biasing means to bias said sliding pin towards said sliding pin recess.

Another aspect is a magnetic gate for a carabiner, comprising: an outer cylinder having a sliding pin recess disposed on the inside surface of said outer cylinder and a sliding pin locating structure on the outside surface of said outer cylinder; an inner cylinder disposed within said outer cylinder; said inner cylinder having a bore partially therethrough; a sliding pin spring disposed within said bore; a sliding pin having a shoulder; said sliding pin spring contacts said shoulder to bias said sliding pin in said sliding pin recess; said sliding pin being made of ferrous material; whereby when a magnet is placed near said sliding pin locating feature having a stronger force than the sliding pin spring, said sliding pin is displaced toward said sliding pin locating feature and removed from said sliding pin recess.

Another aspect is a magnetic gate for a carabiner, comprising: an outer cylinder having a sliding pin recess on the inside surface and having a sliding pin locating structure on the outside surface; a nylon sleeve disposed within said outer cylinder; an inner cylinder disposed with said nylon sleeve; said inner cylinder having a bore; a sliding pin spring disposed in said bore, a sliding pin biasly disposed in said bore; said sliding pin having two diameters that define a shoulder; said sliding pin spring biases said shoulder to bias said sliding pin into said sliding pin recess; said bore disposed between said sliding pin recess and said sliding pin locating feature; said outer cylinder rotatably disposed with respect to said nylon sleeve; a pivot arm pivotally connected to a C-shaped frame first end, and releasably connected to a C-shaped from second end.

These and other features, aspects and advantages of the present invention will become better understood with reference to the following drawings, description and claims.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a front view of a gate according to the present disclosure in a closed position;

FIG. 3 is a sectional view taken along line 3-3 of FIG. 2;

FIG. 4 is a sectional view taken along line 4-4 of FIG. 2;

DETAILED DESCRIPTION

Figure 1:
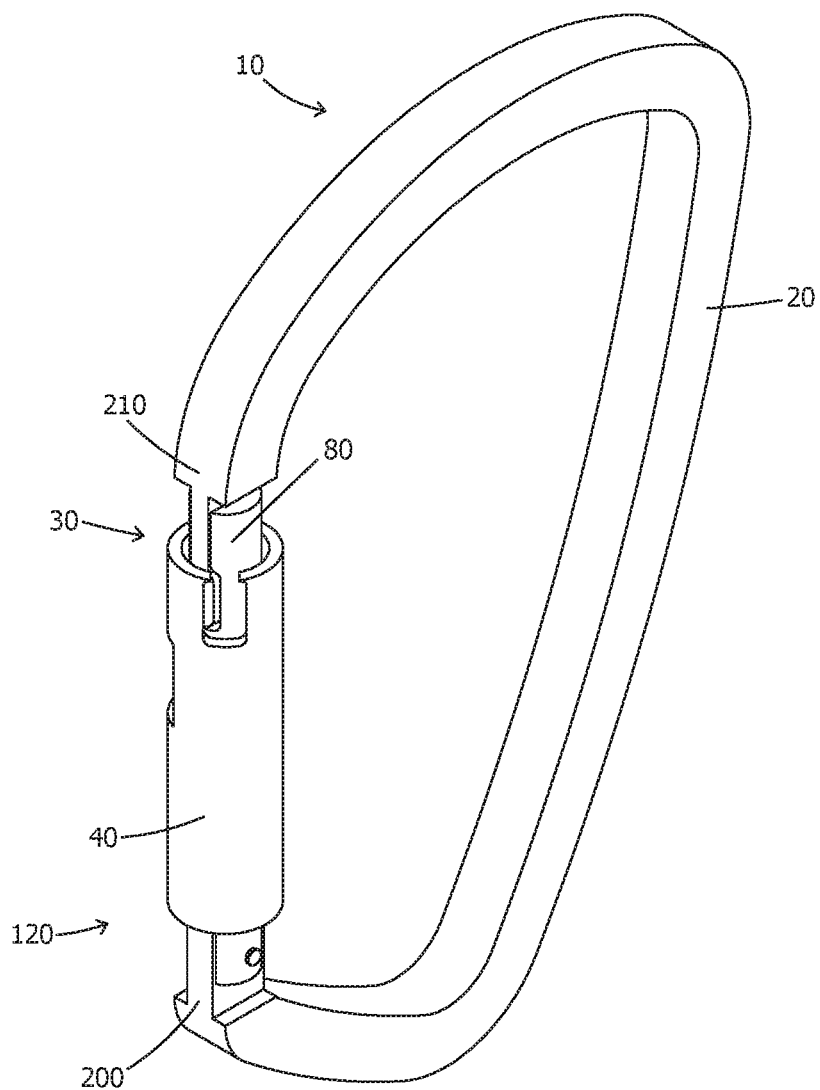
FIG. 1 is a perspective view of one embodiment of a carabiner with magnetic gate according to the present disclosure in a closed position.

Reference Numerals 10 carabiner
20 C-shaped frame
30 gate or magnetic gate
40 outer cylinder
50 sliding pin
60 sliding pin biasing means or sliding pin spring
70 sliding pin locating feature or structure
80 inner cylinder
90 torsion spring
100 nylon sleeve
110 outer cylinder cutout
120 closed position
130 open position
140 sliding pin recess
150 finger
160 bore
170 shoulder
180 pivot arm
200 C-shaped frame first end
210 C-shaped frame second end
220 safety harness
230 lanyard
240 challenge course track
250 longitudinal axis Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words.

Figure 7:
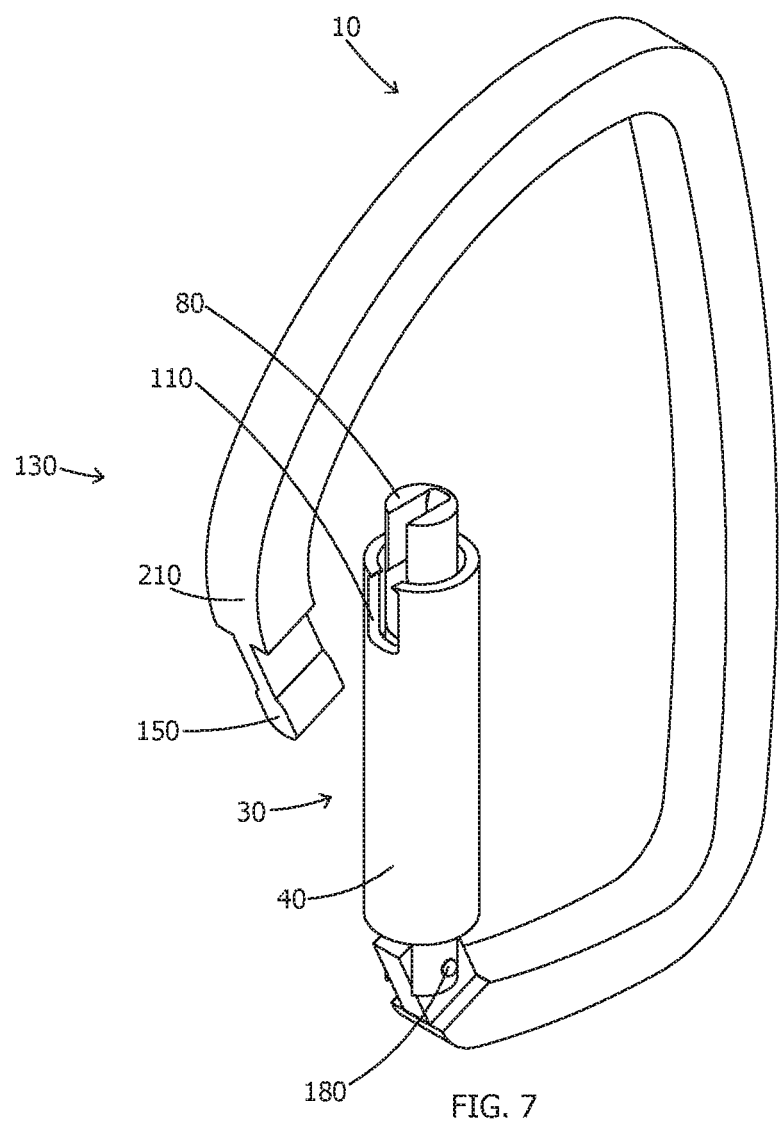
FIG. 7 shows the view of FIG. 1 with the carabiner in an open position.

FIG. 1 illustrates one embodiment of a magnetic gate 30 for a carabiner 10 according to the present disclosure. The gate 30 may have a longitudinal axis 250 (see FIG. 4). A carabiner frame 20 may be a C-shaped arm. The position of the gate 30 may define the carabiner 10 being in the closed position 120 (as seen in FIG. 1) or the open position 130 (as seen in FIG. 7). The gate 30 may have an outer cylinder 40 that may rotate angularly with respect to a longitudinal axis 250 relative to an inner cylinder 80. The outer cylinder 40 may rotate with respect to said inner cylinder 80 or a nylon sleeve 100. Although the gate 30 is described as functioning with a C-shaped frame 20 to form a carabiner clip 10, the gate 30 of the present disclosure may be applied to other applications as well.

FIG. 2 illustrates an embodiment of a gate 30 according to the present disclosure. Illustrated is one embodiment of the relationship of the outer cylinder 40 and the inner cylinder 80 in the closed position 120. The outer cylinder 40 may rotate relative to the inner cylinder 80 to place the carabiner from the open position 130 to the closed position 120, and from the closed position 120 to the open position 130. A torsion spring 90 may bias the gate 30 to the closed position (see FIG. 4), as in a carabiner clip with a torsion spring made by RK, namely Steel-Carabiner-50 kn-11,200 lb-Rated-Twist-Auto-Lock-ANSI-Certified. The torsion spring 90 may rotate the outer cylinder 40 with respect to the inner cylinder 80 angularly about a longitudinal axis 250.

In this embodiment, the outer cylinder 40 is biased in the closed position 120 unless an external force, such as a user twisting the outer cylinder 40, overrides the force of the torsion spring 80. In that case, the outer cylinder 40 may be rotated so that an outer cylinder cut out 110 of the outer cylinder 40 is aligned with the portion of the frame 20 adjacent to the cylinder cut out 110 in a position whereby the outer cylinder cut out 110 is wider than said portion of the frame 20.

FIG. 2 also illustrates the pivot arm 180. This pivot arm 180 enables the gate 30 to pivot once the outer cylinder 40 is moved to the open position 130. This pivot arm 180 is generally found in most or all carabiner clips, including the RK carabiner identified above. The gate 30 may have a pivot arm 180 and may be pivotally connected to a C-shaped frame first end 200, and the gate 30 may be releasably connected to a C-shaped frame second end 210 near the cut out 110.

FIG. 3 illustrates a sectional view taken along line 3-3 of FIG. 2. This view illustrates the positioning of the outer cylinder 40 with respect to the inner cylinder 80. A sliding pin 50 may be slidably disposed in the inner cylinder 80. The sliding pin 50 may be biased into a locking pin recess 140, which is disposed into the inside surface of the outer cylinder 40. The sliding pin 50 may be biased or displaced in a direction that is substantially perpendicular to the longitudinal axis 250. The sliding pin 50 may be disposed in the bore 160 between a sliding pin locating structure or feature 70 and the sliding pin recess 140.

FIG. 3 also discloses a sliding pin locating feature 70 disposed on the outer cylinder 40. This sliding pin locating feature 70 is disposed on the outside surface of the outer cylinder 40 along a linear axis of the sliding pin 50. This sliding pin locating feature 70 may be visual, tactile, or both. In one embodiment, the sliding pin locating feature 70 may be a flattened portion of the outer cylinder 40 as illustrated in FIGS. 2 and 3.

FIG. 4 illustrates a sectional view taken along line 4-4 of FIG. 2. The inner cylinder 80 is disposed inside the outer cylinder 40. A torsion spring 90 is operably connected to the inner cylinder 80 and the outer cylinder 40 to bias the outer cylinder in the closed position 120, as in the RK Steel-Carabiner-50 kn-11,200 lb-Rated-Twist-Auto-Lock-ANSI-Certified. The sliding pin spring 60 is also illustrated. Although a sliding pin spring 60 is illustrated, other biasing means 60 may be used as well within the scope and spirit of the present disclosure. For example, a magnet may be placed on the outer cylinder 40 to attract or bias the sliding pin 50 to the outer cylinder 40. It would then take a stronger magnet placed at the sliding pin locating structure 70 to bias or displace the sliding pin 50 toward the sliding pin locating structure 70 to remove the sliding pin 50 from the sliding pin recess 140. The sliding pin spring 60 biases, pushes, or displaces said sliding pin 50 into the sliding pin recess 140.

A nylon sleeve 100 may be positioned between the inner cylinder 80 and outer cylinder 40. The nylon sleeve 100 allows the outer cylinder 40 to be smoothly rotated with respect to the inner cylinder 80. A nylon ring or a set of nylon rings may also be used rather than the nylon sleeve 100.

Figure 5:
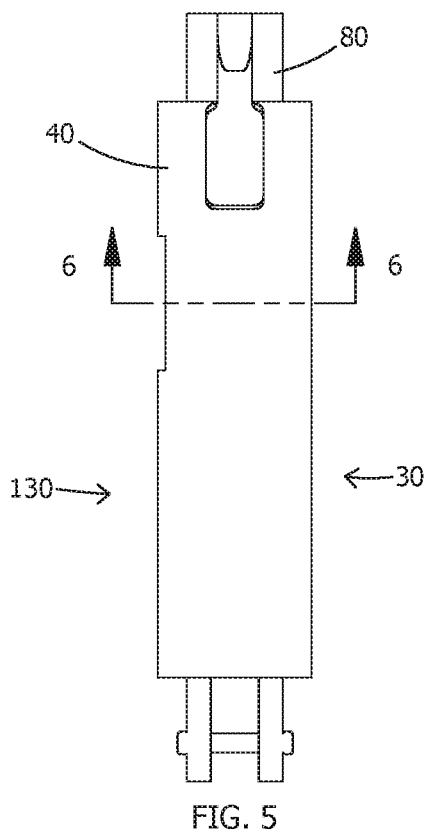
FIG. 5 is a front view of the gate of FIG. 2 in an open position.
Figure 6:
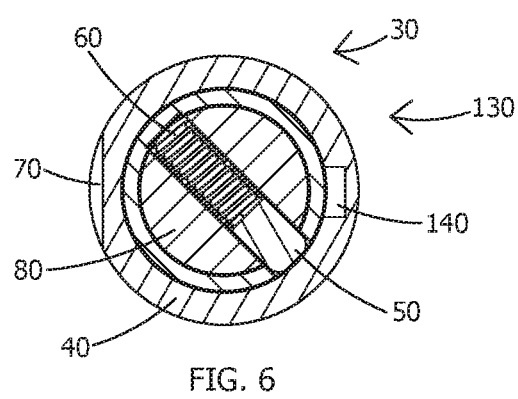
FIG. 6 is a sectional view taken along line 6-6 of FIG. 5.

FIG. 6 is a cross sectional view taken along line 6-6 of FIG. 5, when the gate 30 is in the open position 130. Here, the sliding pin 50 is removed from or displaced away from the sliding pin recess 140 of the inside surface of the outer cylinder 40. When the sliding pin 50 is not in the sliding pin recess 140 then the outer cylinder 40 can be rotated or angularly rotated with respect to the inner cylinder 80 to place the outer cylinder 40 and hence the gate 30 in the open position 130. This can position the outer cylinder cut out 110 so it is wider than the finger 150, and the gate 30 can be displaced inwardly (or outwardly) to hook the carabiner 10 up to something (see FIG. 7). Then after the carabiner is properly hooked, then the gate 30 can be placed back in the closed position 120. The sliding pin recess 140 may be the same diameter as a bore 160 that is in the inner cylinder 80. The sliding pin recess 140 may be about 1/16" or about 1/8" in depth for example. The bore 160 and sliding pin recess 140 may have the same diameter, which is larger than the diameter of both the sliding pin 50 and the sliding pin spring 60. The sliding pin spring 60 may have a diameter not larger than the largest diameter of the sliding pin 50 so the sliding pin spring 60 can bias against the shoulder 170 in some embodiments (see FIG. 8).

In operation, when a magnet is placed near the sliding pin locating structure or feature 70, the sliding pin 50 moves toward the magnet, which removes the sliding pin 50 from the sliding pin recess 140. This allows the outer cylinder 40 to be rotated with respect to the inner cylinder 80 or the nylon sleeve 100. The force of the magnet on the sliding pin 50 must be greater than the force of the sliding pin spring 60 to move the sliding pin 50 out of the sliding pin recess 140 and toward the sliding pin location feature 70.

Figure 8:
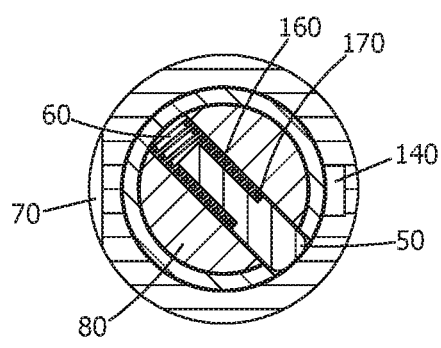
FIG. 8 shows another embodiment in the view of FIG. 6.

The inner cylinder 80 may have a bore 160 that does not extend the entire diameter of the inner cylinder 80. The sliding pin 50 may be slidably disposed within said bore 160 and said sliding pin recess 140 in the closed position. Referring to FIG. 8, the sliding pin 50 may have a shoulder 170 that the sliding pin spring 60 pushes or is biased against. In other words, the sliding pin spring 60 biases or pushes the sliding pin 50 toward or into the sliding pin recess 140. The bore 160 is also illustrated as having an open end and not going through the entire diameter of the inner cylinder 80. This way the bore 160 can hold the sliding pin spring 60 therein.

The sliding pin 50 may be made of ferrous material, such that when a magnet of sufficient force is disposed near the sliding pin locating feature 70, the magnetic force pulls or displaces the sliding pin 50 toward the magnet, which removes the sliding pin 50 from the sliding pin recess 140.

The magnet used to displace the sliding pin 50 may be disposed in the finger of a glove, or it may be disposed in one of the columns of the challenge course, or a portable gun magnet, such as the AJC Mini Magnetic Sweeper with Release, Product #070-MM.

Figure 9:
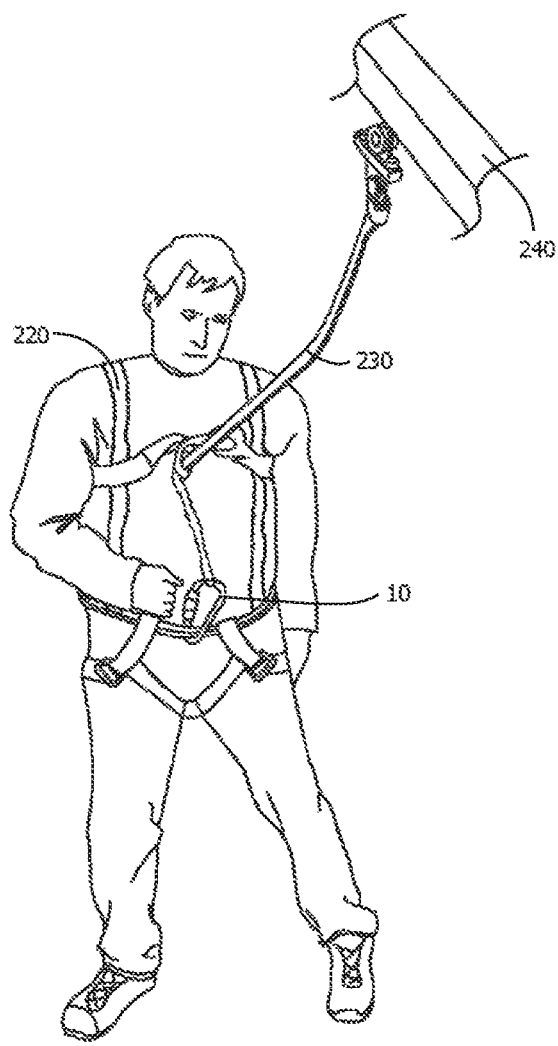
FIG. 9 is a pictorial view of a carabiner being used to connect a safety harness to a lanyard that is extending downwardly from a trolley in a track of a challenge course.

FIG. 9 illustrates a setting in which the magnetic gate for a carabiner 10 according to the present disclosure may be used. The carabiner 10 may connect lanyard 230 to the safety harness 220 being worn by the user. The safety lanyard 230 is illustrated extending down from the challenge course track 240 of a challenge course.

Although particular embodiments of the invention have been discussed in detail for illustrative purposes, it will be recognized that variations or modifications of the disclosed apparatus, including the rearrangement of parts, lie within the scope of the present invention.

We claim:

1. A magnetic gate for a carabiner having a closed position and an open position, comprising:
   an outer cylinder having a sliding pin recess internally disposed into an inside surface of said outer cylinder;
   an inner cylinder having a bore;
   said outer cylinder rotatably disposed outside of said inner cylinder;
   said bore containing a sliding pin; and
   a biasing means to bias said sliding pin towards said sliding pin recess in the closed position;
   wherein said sliding pin recess does not extend through to an outside surface of said outer cylinder.

2. The apparatus of claim 1, wherein said biasing means is a sliding pin spring that is disposed in said bore to contact said sliding pin to bias said sliding pin towards said sliding pin recess in the closed position.

3. The apparatus of claim 1, wherein said sliding pin is made with ferrous material.

4. The apparatus of claim 1, wherein said sliding pin reacts to a magnet.

5. The apparatus of claim 4, whereby when the magnet is placed near the outer cylinder opposite the sliding pin recess with respect to the sliding pin in the closed position, and when the force of the magnet is stronger than the force of the sliding pin spring and the magnet is arranged adjacent the outer cylinder opposite the sliding pin recess with respect to the sliding pin in the closed position, the sliding pin is displaced toward the magnet and away from the sliding pin recess.

6. The apparatus of claim 1, further comprising:
   a pivot arm disposed at one end of said magnetic gate;
   said pivot arm pivotally connected to a C-shaped frame first end of the carabiner; and
   said magnetic gate being releasably connected to a C-shaped frame second end of the carabiner.

7. The apparatus of claim 1, further comprising a nylon sleeve disposed within said outer cylinder and outside of said inner cylinder.

8. The apparatus of claim 1, further comprising a sliding pin locating structure disposed on said outer cylinder whereby said sliding pin is disposed between said sliding pin locating structure and said sliding pin recess in the closed position.

9. The apparatus of claim 8, wherein the sliding pin locating structure comprises at least one of a visual element or a tactile element.

10. The apparatus of claim 1, further comprising a torsion spring to bias said outer cylinder into the closed position.

11. A magnetic gate for a carabiner having a closed position and an open position, comprising:
    an outer cylinder having a sliding pin recess disposed on an inside surface of said outer cylinder and a sliding pin location structure on an outside surface of said outer cylinder;
    an inner cylinder disposed within said outer cylinder;
    said inner cylinder having a bore extending partially therethrough;
    a sliding pin made of ferrous material slidably disposed in said bore;
    said sliding pin having a shoulder;
    a sliding pin spring disposed within said bore;
    said sliding pin spring contacts said sliding pin to bias said sliding pin in said sliding pin recess in the closed position; and
    whereby when a magnet is placed near said sliding pin locating structure having a stronger force than the sliding pin spring, said sliding pin is displaced toward said sliding pin locating structure and removed from said sliding pin recess.

12. The apparatus of claim 11, further comprising:
    a nylon sleeve disposed between said inner cylinder and said outer cylinder.

13. The apparatus of claim 11, further comprising:
    a pivot arm disposed a one end of the magnetic gate;
    said pivot arm pivotally connected to a C-shaped frame first end of the carabiner; and
    said magnetic gate being releasably connected to a C-shaped frame second end of the carabiner whereby when the magnetic gate is in the open position the magnetic gate may pivot about said pivot arm.

14. The apparatus of claim 11, wherein the sliding pin is made of ferrous material.

15. The apparatus of claim 11, wherein the sliding pin comprises two diameters that define a shoulder of the sliding pin, and the sliding pin spring contacts said shoulder to bias the sliding pin.

16. The apparatus of claim 11, wherein the sliding pin locating structure comprises at least one of a visual element or a tactile element.

17. A magnetic gate for a carabiner having a closed position and an open position, comprising:
    an outer cylinder having a sliding pin recess on an inside surface of said outer cylinder and having a sliding pin locating structure on an outside surface of said outer cylinder;
    a nylon sleeve disposed within said outer cylinder;
    an inner cylinder disposed with said nylon sleeve;
    said inner cylinder having a bore;
    a sliding pin spring disposed in said bore;
    a sliding pin biasly disposed in said bore;
    said sliding pin spring contacts said sliding pin to bias said sliding pin into said sliding pin recess in the closed position;
    said bore disposed between said sliding pin recess and said sliding pin locating feature in the closed position;
    said outer cylinder rotatably disposed with respect to said nylon sleeve; and
    a pivot arm pivotally connected to a C-shaped frame first end of the carabiner, and said magnetic gate releasably connected to a C-shaped frame second end of the carabiner near an outer cylinder cut out of said outer cylinder.

18. The apparatus of claim 17, wherein the sliding pin is made of ferrous material.

19. The apparatus of claim 17, wherein the sliding pin comprises two diameters that define a shoulder of the sliding pin, and the sliding pin spring contacts said shoulder to bias the sliding pin.

20. The apparatus of claim 17, wherein the sliding pin locating structure comprises at least one of a visual element or a tactile element.

\* \* \* \* \*